Nov. 7, 1944.  L. E. CLINE  2,362,115
MACHINE FOR TRIMMING GLASS AMPOULES
Filed May 3, 1940  8 Sheets-Sheet 7

Nov. 7, 1944. L. E. CLINE 2,362,115
MACHINE FOR TRIMMING GLASS AMPOULES
Filed May 3, 1940 8 Sheets-Sheet 8

Inventor
Leon E. Cline
By Charles B. Belknap
Attorney

Patented Nov. 7, 1944

2,362,115

UNITED STATES PATENT OFFICE 2,362,115

MACHINE FOR TRIMMING GLASS AMPOULES

Leon E. Cline, Vineland, N. J., assignor to Kimble Glass Company, Vineland, N. J., a corporation of Illinois Application May 3, 1940, Serial No. 333,237

7 Claims. (Cl. 49—48)

The present invention relates to a machine for severing the necks of glass ampoules. The machine broadly includes a conveying apparatus having thereon means for firmly holding ampoules, severing mechanism, and means for releasing and discharging the ampoules after portions of the necks thereof have been severed therefrom.

In one widely used method of shaping ampoules from glass tubing a portion of the tubing is softened by a flame and this heated portion is stretched to reduce the diameter of the tubing, thus forming a neck which tapers from each end toward the middle thereof. The stretched neck is considerably longer than is necessary for a finished ampoule and, by a subsequent operation, the extra length is severed from the remainder of the ampoule substantially at that portion of the taper having the smallest cross section. This may be done either by cold cutting with a knife or saw, in which case the neck has an open end, or by means of a sharp flame, the latter method not only severing the neck but sealing the end thereof.

The invention will be more fully understood from the following description thereof, reference being had to the accompanying drawings illustrating a preferred form of machine for carrying out the invention and in which Figs. 1 and 1a taken together show a preferred form of the invention in front elevation and partly in section;

Figs. 2 and 2a taken together constitute a top plan view of the machine shown in Figs. 1 and 1a;

Fig. 10 is an enlarged section of an adjusting device for the positioning rings taken on line 10—10 of Fig. 2a;

Fig. 15 is an enlarged elevation of an ampoule showing the relative positions of the ampoule neck and the cutting edge of a scoring device.

Referring to the drawings, the supoprting frame for the machine consists of a base plate 20 supported by legs 21. A motor 22 for actuating the conveyor portion of the machine is illustrated as being fixed to plate 20 on the under side thereof. Vertical shaft 23 is driven by the motor through belt 24, reduction gearing 25, 26, shaft 27, worm 28, and worm gear 29 fast on shaft 23. Suitable bearings for shaft 23 are indicated at 30, 31 on plate 20 and in housing 32 secured to the underside of plate 20. Sub-frame 33 on the upper side of plate 20 also has thereon bearing 34 for disc 35, the latter having a boss 36 thereon secured to shaft 23 and forming one of the races for the bearing. Spaced from disc 35 and from each other are spiders 37, 38 which are also constrained to rotate with shaft 23 by means to be explained in another portion of this description.

As will be seen in Figs. 1a, 8, 9, and 10, a relatively thin annular plate 39 is secured to disc 35. Adjustably fixed to plate 39 on the upper side thereof are a pair of rings 40, 40' having oppositely directed saw-tooth notches 41 in their peripheral edges. A second pair of rings 42, 42' are adjustably secured to the under side of plate 39, the latter pair of rings having rectangular notches 43, the sides of which are substantially parallel and radial, in their peripheral edges. The purpose of these notched rings will be explained hereinafter.

Spider 37 carries on the under side thereof a plurality of contiguous forked fingers 44, each aligned with the notches in rings 40, 40', 42, 42', and designed to support an ampoule as the latter is conveyed around the machine. These fingers, of which there are approximately fifty, form an endless annular conveyor rotatable with shaft 23. Each finger is bent upwardly at its outer end and is held to the spider by bolt 45, the head of which engages the lower face of the finger as will be seen in Figs. 1a and 12. The bolt passes through the spider, a spring 46 surrounding the upper portion of the bolt bearing against a nut 47 on the bolt and against the rim 48 of the spider. Pin 49 on the rim cooperates with an aperture 50 at the rear of the finger to prevent rotation of the finger about the bolt. Thus it will be seen that the fingers are vertically yieldable.

Spider 38 supports a rim 51 having an annular radial flange 52 forming an abutment on the under side of which is a pad 53 of rubber or other soft material. The furcations of fingers 44 are designed to straddle the constricted portion 54 of an ampoule and urge the latter upwardly so that the base of the ampoule is held firmly against pad 53.

Figure 1:
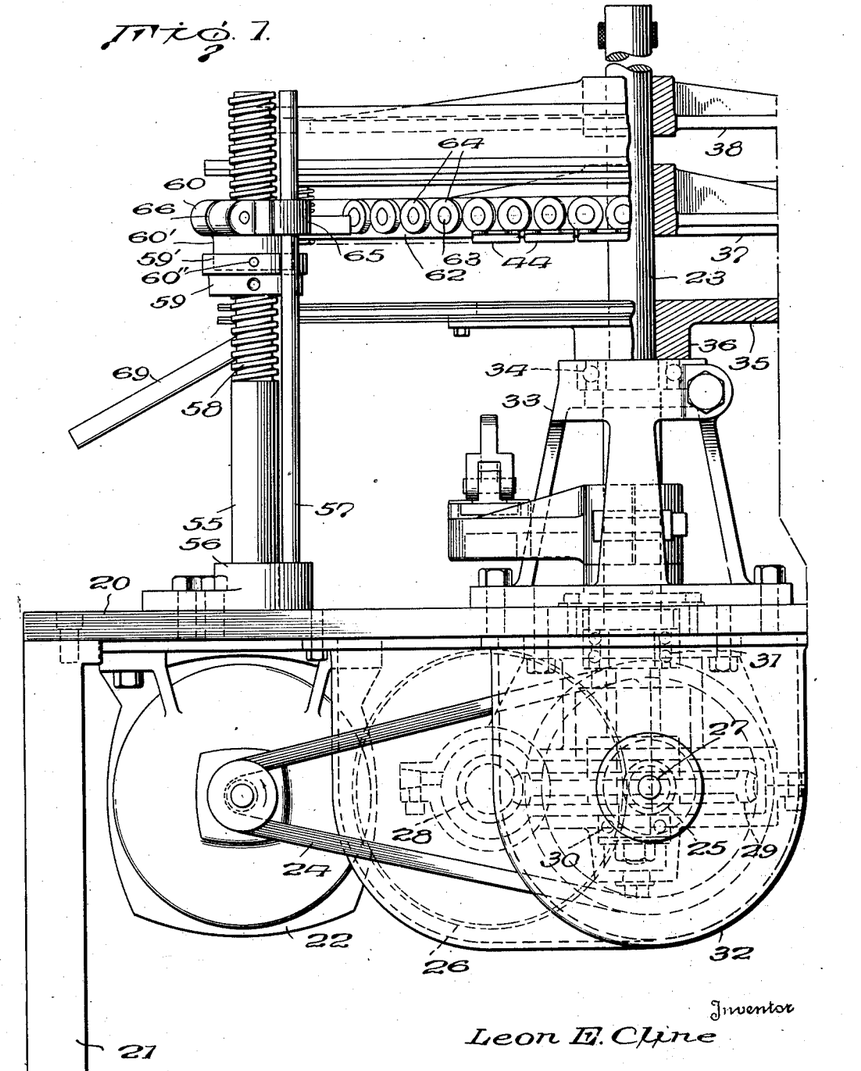
Figure 2:
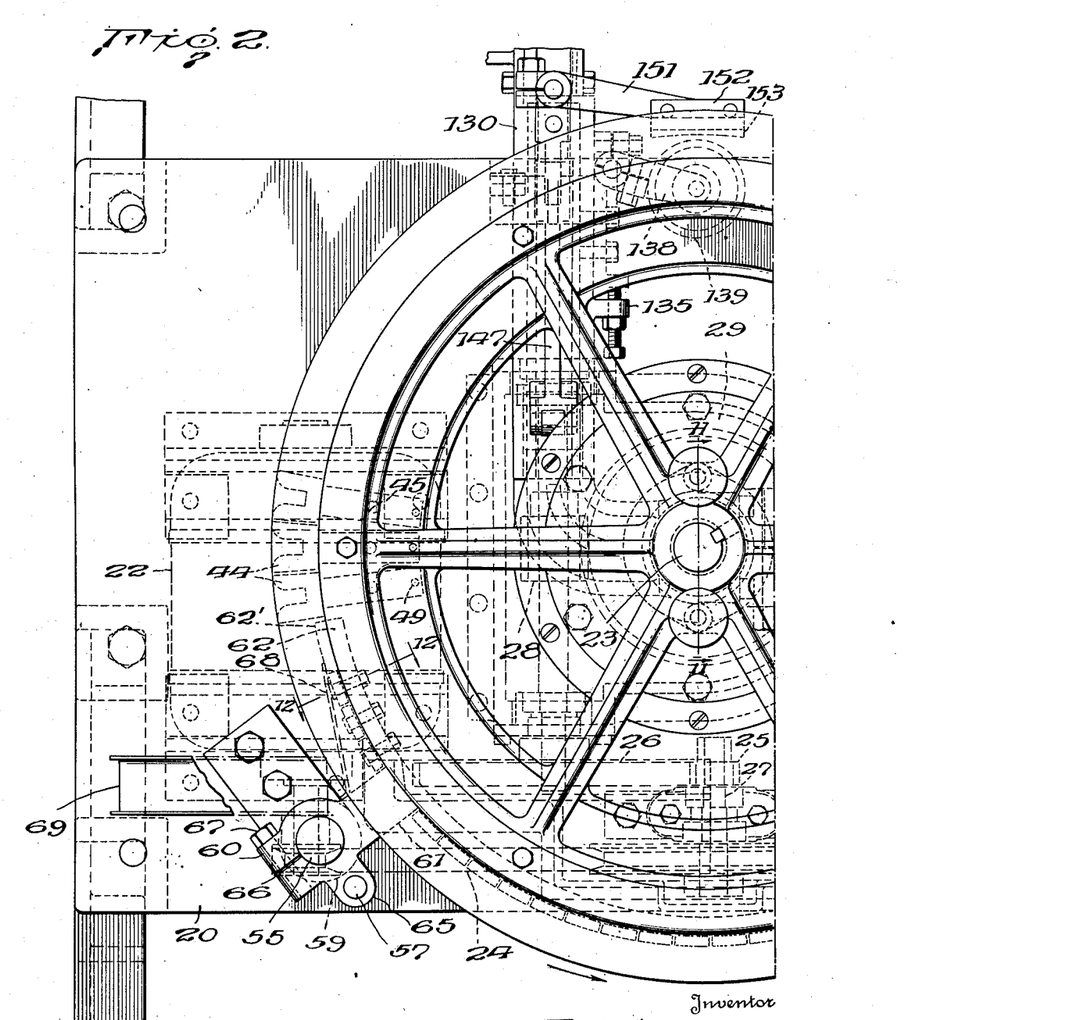

In Figs. 1 and 2 there is shown a post 55 held to base plate 20 by a bracket 56 which also supports a guide rod 57. The upper end of the post is threaded as at 58 to receive an adjusting nut 59, the latter having a recess 59' in its upper face adapted to receive boss 60' on yoke 60 and thus form a support for the yoke. The nut and yoke are provided with registering holes into which pin 60'' is inserted to lock the yoke to the nut. Arm 61 attached to the yoke is an extension of arcuate bar 62 having a finger depressing cam 62' at its forward end. A plurality of radial pins 63 supporting rollers 64 are fixed in the bar. Yoke 60 has formed thereon a lateral apertured ear 65 cooperating with guide rod 57 to prevent rotation of the arcuate bar around post 55. The yoke, furthermore, is split at 66 and may be tightened by means of screw 67 to grip the post firmly. The purpose of rollers 64 is to depress fingers 44 on rotating spider 37 after the ampoules have been trimmed and to maintain them in their depressed positions out of engagement with abutment 52 during further rotation of the spider while uncut ampoules are deposited on the conveyor by an operator. A cam plate 68, Fig. 2, urges the cut ampoules out of the supporting fingers, the ejected ampoules being deposited on chute 69. While the fingers are depressed, the ampoules are spaced from pad 53 so that ejection of the ampoules is easily effected.

Figures 1A, 10, 15:
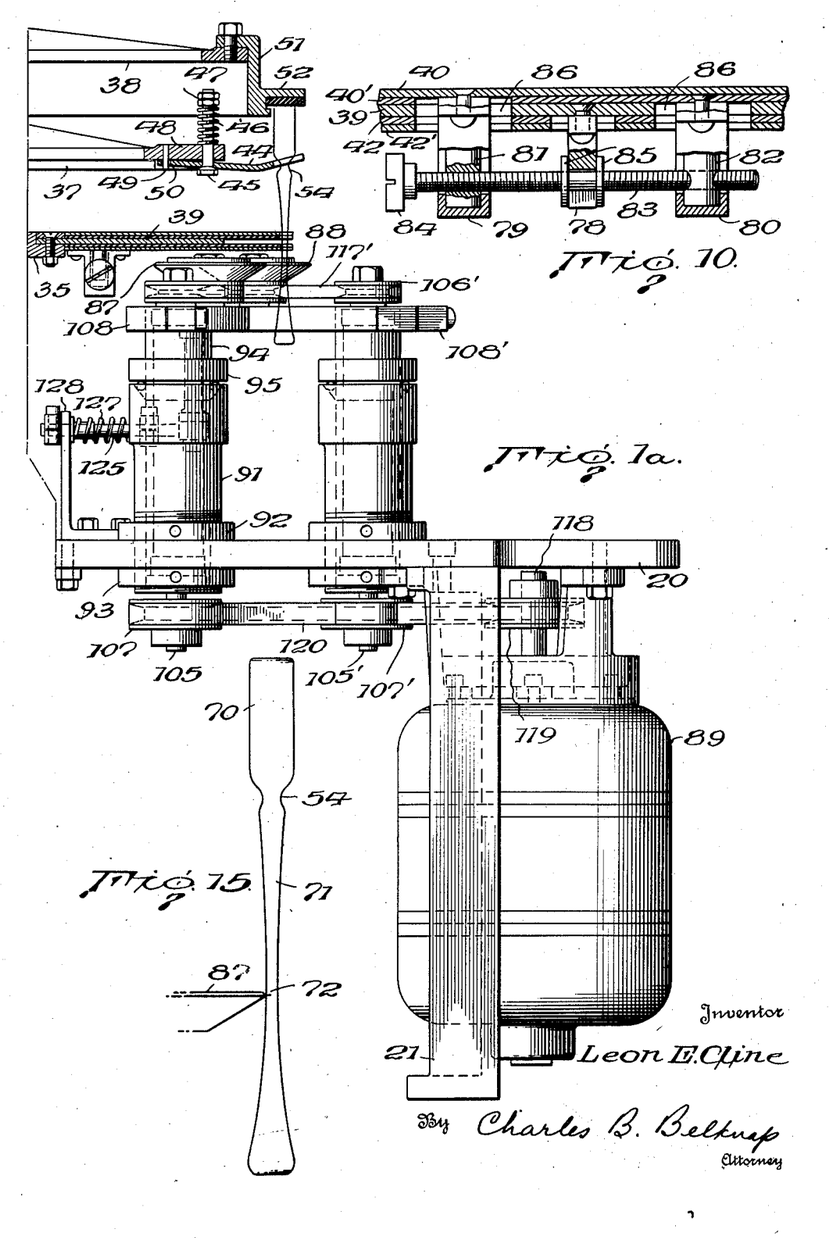

The machine is designed to trim ampoules of varying sizes and, for this reason, it is necessary to provide means for adjusting the spacing between spider 37 carrying the supporting fingers and spider 38 to which pad 53 is secured. As seen in Fig. 15, ampoules shaped on a type of machine now used extensively comprise a body portion 70 and an elongated neck portion 71, the juncture of the neck and body being constricted at 54. While these ampoules are made in several sizes, their proportions are substantially the same for all sizes. The ampoule is trimmed by breaking off the lower or superfluous end thereof in a transverse plane indicated generally by a score line 72. This score is made by a tool to be later described. Obviously, since the length of the body of one size ampoule differs from that of another size, the distance between spiders 37 and 38 must be adjusted to accommodate the particular size ampoule being trimmed.

Figures 11, 12, 13, 14:
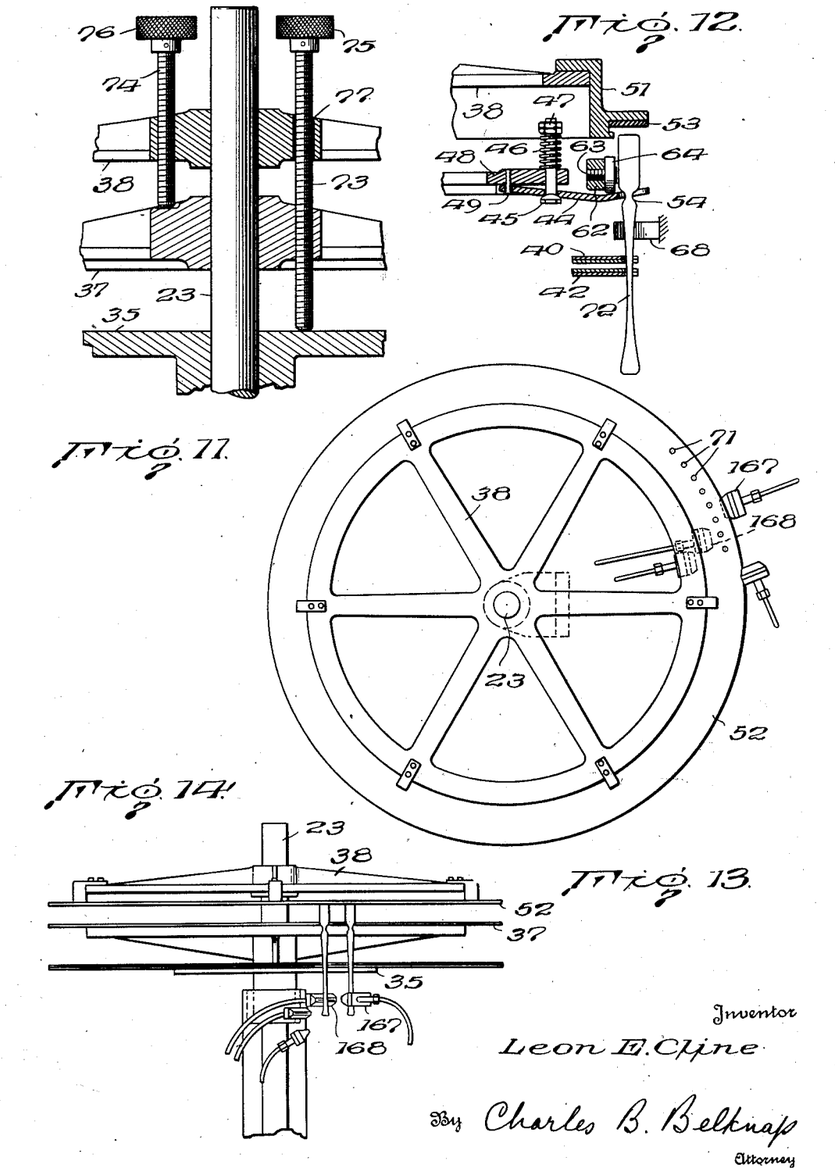
Fig. 11 is a fragmentary and sectional elevation of means for spacing portions of the conveyor mechanism of the machine taken on line 11—11 of Fig. 2.
Fig. 12 is a partial sectional view of means for releasing and ejecting ampoules from the machine taken on line 12—12 of Fig. 2.
Fig. 13 is a top plan view of a modified severing means.
Fig. 14 is a front view of the modified severing means shown in Fig. 13.
Figure 16:
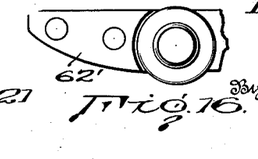
Fig. 16 is an enlarged fragmentary view of a depressing cam for releasing the ampoules.

As will be seen in Figs. 2 and 11, the spiders are keyed to shaft 23 to rotate therewith and are vertically adjustable with respect to each other and to disc 35. This vertical adjustment is effected by means of threaded adjusting rods 73, 74 having knurled heads 75, 76, rod 73 being threaded in spider 37 and rod 74 in spider 38. It is to be noted that bore 77 in spider 38 is somewhat larger than rod 73, there being no threaded connection therebetween. The lower end of threaded rod 73 bears against disc 35 so that the distance between spider 37 and disc 35 may be adjusted by turning rod 73. In like manner rod 74 bears against spider 37 and by turning this rod adjustment of the distance between spiders 37 and 38 is made.

Although fingers 44 support the ampoules and position them at the proper height, further centering and bracing of the ampoules is desirable. The notched rings 40, 40', 42, and 42' are provided for this purpose. In order to adjust the notches in these rings circumferentially to diminish or increase the distance between the radial sides of the notches, the mechanism illustrated in Figs. 2a, 8, 9, and 10 is provided. The device shown in Fig. 10 illustrates the means for adjusting rings 40, 40' and, since a similar arrangement is provided for adjustment of rings 42, 42', only the adjustment for one set of rings is illustrated. From the drawings it will be seen that a depending furcated bracket 78 is riveted or otherwise secured to plate 39. There are secured to ring 40, 40', respectively, a pair of depending pivot blocks 79, 80, in which are pivot pins 81, 82. Each of these pins is threaded to receive adjusting screw 83 having right and left threads thereon and having a slotted head 84. Washers 85 are fixed to screw 83 and engage bracket 78 to prevent longitudinal displacement of the screw. It is obvious that, by turning the adjusting screw, the rings may be rotated with respect to each other, thus changing the distance between the radial sides of the notches. The adjusting screw 83' having slotted head 84' cooperates with bracket 78' and pivot pins 81', 82' to adjust rings 42, 42'. These latter pins are held in blocks 79', 80' fixed, respectiviely, to rings 42, 42' so that the latter may be rotated with respect to each other in a manner similar to that for adjusting rings 40, 40'. Arcuate slots 86 in plate 39 and the notched rings are provided to permit attachment of the pivot blocks and brackets thereto without interfering with relative movement of the rings with respect to the plate and to each other.

Figure 9:
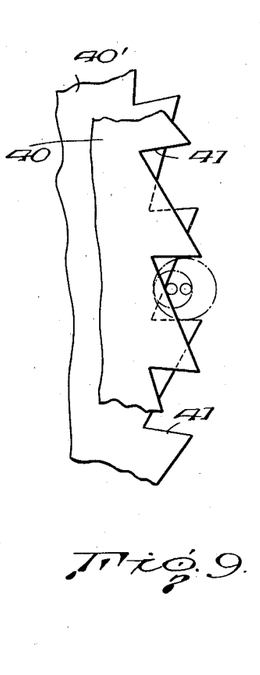
Fig. 9 is an enlarged fragmentary top view of two of the rings shown in Fig. 8.

In Fig. 9 there are shown in construction lines end views of two ampoules, one larger than the other. It will be seen that the longitudinal axis of the larger ampoule is spaced a distance radially greater than that of the other ampoule. This is due to the fact that the depth of the notches of fingers 44 is non-adjustable, thus preventing large ampoules from entering the notches as far as do small ampoules. Hence, the rings 40, 40' are rotated sufficiently to bring the intersection of the inclined sides of the notches to the desired radial distance from the axis of rings to limit radial movement of the ampoule neck. The straight side notches 43 in rings 42, 42' are adjusted to a width which permits the ampoule necks to be positioned therein but which limits movement of the necks in a direction corresponding to the path of the conveyor fingers. In this manner the ampoules are accurately positioned and held against movement during the severing operations.

Figure 2A:
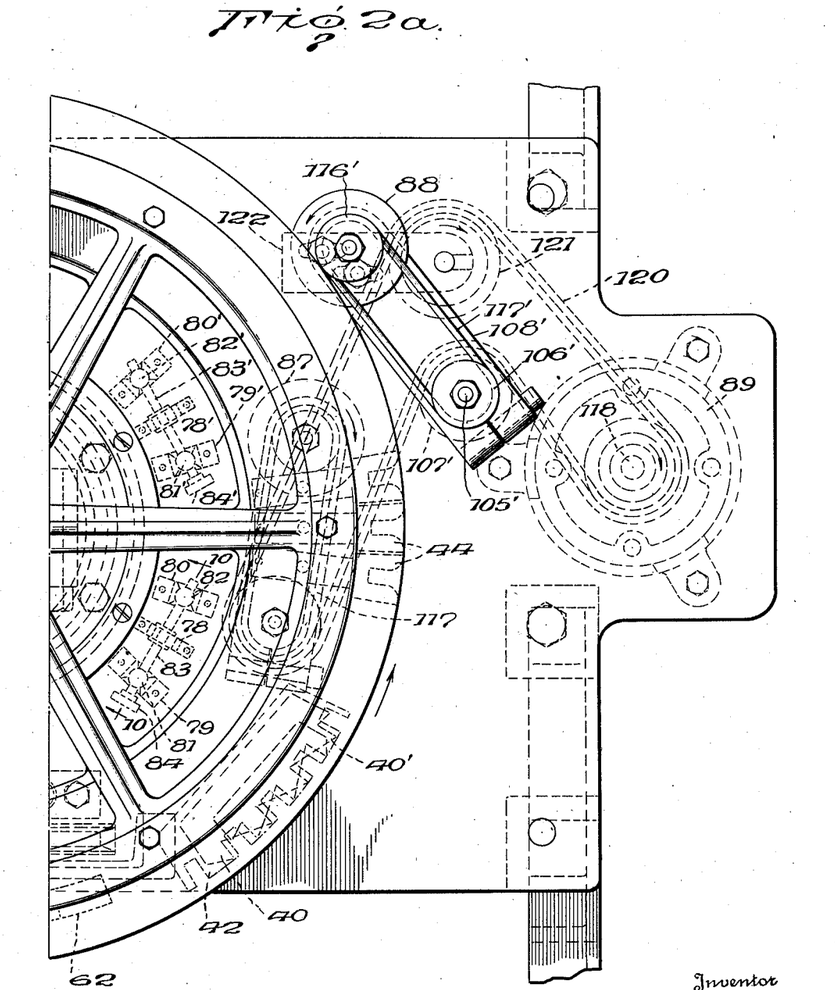
Figure 3:
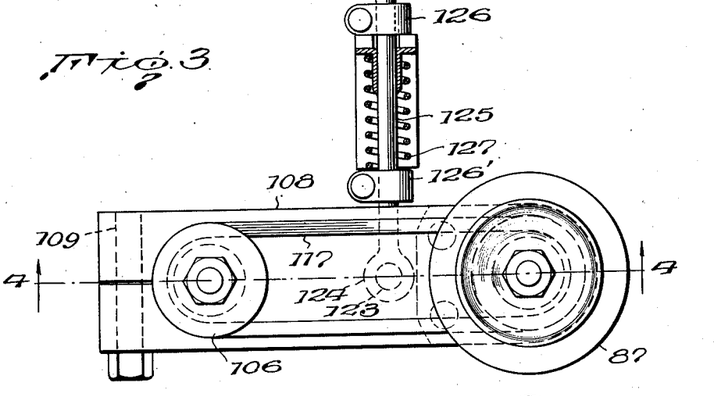
Fig. 3 is a top plan view of a scoring wheel and operating mechanism therefor.
Figure 4:
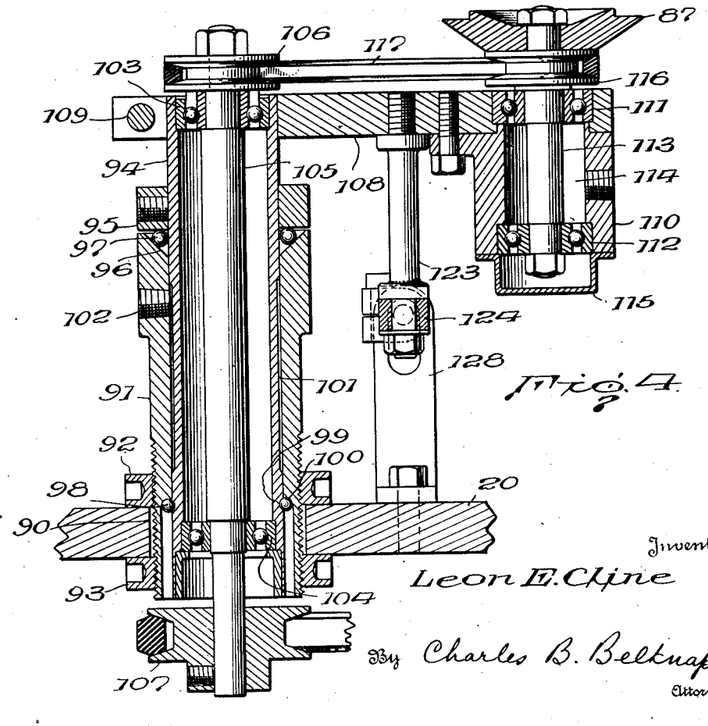
Fig. 4 is a section taken on line 4—4 of Fig. 3.

Atfer the machine operator has deposited a number of ampoules on the conveyor, which is continuously rotated in a counter-clockwise direction as seen in Figs. 2 and 2a, fingers 44 pass rollers 64 and are elevated by springs 46 to hold the bases of the ampoules against pad 53. As shown in Fig. 2a, there is spaced circumferentially from the roller carrying bar 62 and from each other, a pair of scoring discs or saws 87, 88. These saws successively score the ampoule neck on the opposite sides of the neck and in the same transverse plane. The saws are rapidly rotated, being driven by a motor 89 suspended from base plate 20, as shown in Fig. 1a. The mounting and drive connections for each saw are the same. In Figs. 3 and 4, there is shown one of the saws and the mechanism for driving the same. It will be seen from these figures that base 20 is apertured at 90 to receive the threaded lower end of a housing 91. The vertical position of this housing with regard to base 20 is fixed by nuts 92, 93, one above the plate and the other below. Within housing 91 is a sleeve 94 which is secured a bearing ring 95. A tapered annular face 96 at the upper end of housing 91 accommodates balls 97 forming an anti-friction bearing for ring 95. Other balls 98 cooperate with an annular groove 99 in sleeve 94 and a rounded shoulder 100 in the housing to form a radial bearing for the sleeve. The sleeve is reduced at 101 to provide an annular space into which lubricant is introduced through a tapped hole 102. Journaled in anti-friction bearings 103, 104, is a shaft 105 having pulleys 106, 107, secured thereto at its upper and lower ends, respectively.

Sleeve 94 supports an arm 108, one end of which is split so that the arm may be secured to the sleeve by tightening screw 109. The other end of the arm carries a bearing block 110 having anti-friction bearings 111, 112 in which is journaled shaft 113. A space 114 in the block is provided for lubricant and the bottom thereof closed by a cover 115. Pulley 116 is fast on shaft 113 and is driven from pulley 106 through belt 117. Also secured to shaft 113 is the saw 87. Saw 88 is driven through pulleys 106', 116' and belt 117' mounted on an arm 108'. Shaft 105' carries pulley 106' at its upper end and pulley 107' at its lower end.

Referring now to Figs. 1a and 2a, it will be seen that motor shaft 118 has fast thereon a pulley 119 driving belt 120 passing over pulleys 107, 107', and idler 121, the latter journaled on adjustable bracket 122. The saws 87, 88 will then be driven in the direction of the arrows, as indicated on the drawings, scoring the ampoule neck on opposite sides thereof. In order that the saws be urged against the ampoules as they are conveyed past the saws, a depending post 123 on arm 108 is connected to the eye 124 of rod 125 on which collars 126, 126' are fixed, the latter being engaged by one end of a spring 127, the other end of which bears against a fixed abutment 128. Collar 126 is adapted to engage abutment 128 to limit the swing of arm 108. This abutment is bolted to base plate 20. The pressure of the spring is thus imposed on arm 108 and, since the latter is secured to sleeve 94, the sleeve will rotate in its bearings as the position of the saw varies. Similar means for urging saw 88 into engagement with an ampoule are associated with arm 108'.

After the ampoules have been scored by the saws, the necks are broken at the score line, the superfluous stock being collected for re-melting. The mechanism for breaking off the stock is illustrated in Figs. 2, 5, 6, and 7. Mounted for oscillation on shaft 23 is an arm 130. Adjustably secured to arm 130 is a bracket 131 having slots 132 therein through which screws 133 pass to attach the bracket to the arm. Screw 134 threaded in lug 135 abuts flange 136 on the bracket. By turning the screw the position of the bracket on arm 130 may be varied. Bracket 131 is provided with a split socket to receive the lower end of post 137 which in turn carries a removable and vertically adjustable arm 138 in which is supported for rotation thereon a roller or brace 139. Also secured to arm 130 is a depending bracket 140 carrying a cam follower 141 which is urged by spring 142 against cam 143, the latter being fast on shaft 28. Spring 142 is fastened at one end to bracket 140 and at its other end to a fixed part of the machine frame. Arm 130 carries a roller 144 which supports the arm and permits it to ride on the upper face of base plate 20.

Figures 5, 6, 7:
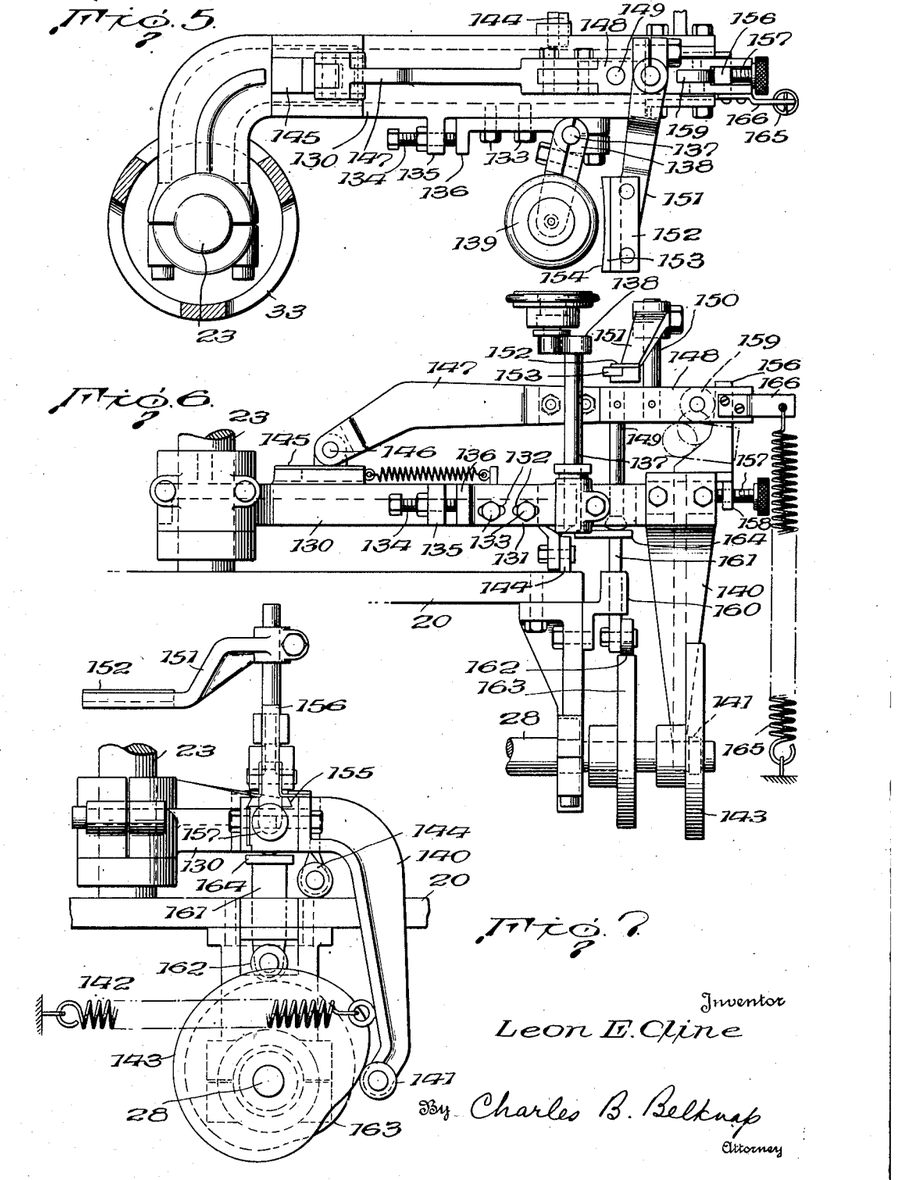
Fig. 5 is a top plan view of a device for breaking off a portion of the scored neck of an ampoule.
Fig. 6 is a side view of the device shown in Fig. 5.
Fig. 7 is a front elevation of the breaking off device.
Figure 8:
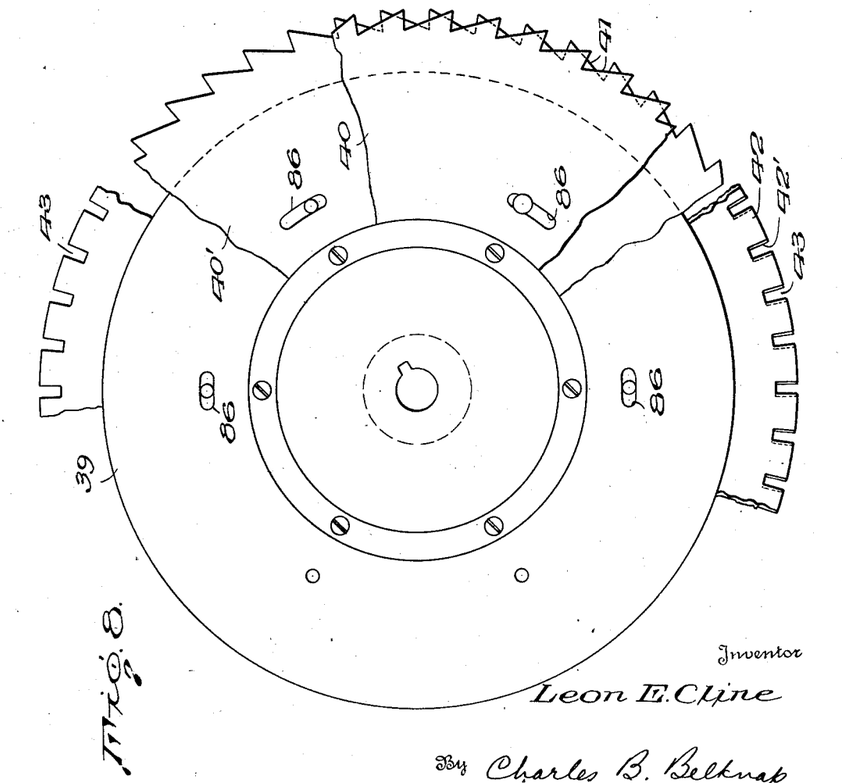
Fig. 8 is a top plan view of positioning rings, parts thereof being broken away.

Slidably mounted for movement longitudinally of the oscillatable arm 130 is block 145 to which is pivoted at 146 a vertically rockable arm 147. Secured to this rocker arm is an extension 148 to which are fastened pin 149 and post 150. Adjustably fixed on post 150 is an arm 151 having clamped thereto by means of plate 152 a contact member 153 preferably made of soft material such as rubber. The exposed edge of the contact member is slightly curved, as shown at 154, the radius of curvature being substantially that of the path of travel of the ampoules. At the forward end of arm 130 a dove-tail way 155 accommodates a cam piece 156 slidably adjustable longitudinally of the way, a screw 157 cooperating with a threaded ear 158 on the cam piece and with arm 130 being provided to position the cam piece with reference to the arm 130. Extension 148 is forked to engage cam piece 156 and carries a follower 159 adapted to engage cam 156. Attached to base plate 20 is a guide 160 in which plunger 161 is adapted to slide, the plunger being vertically reciprocable and having at its lower end a roller 162 riding on cam 163. The upper end of the plunger carries a substantially rectangular plate 164 which is engaged by the lower end of pin 149. Spring 165 attached to extension 166 on arm 147 normally urges the arm, pin 149 and plunger 161 toward cam 163.

The operation of the breaking-off mechanism is as follows: Cam 143 is designed to move arm 130 a distance substantially that between adjacent ampoules on the conveyor and in the direction of travel of the ampoules at the same speed as that of the conveyor, the conveyor being rotated continuously. Arm 147 is constrained to follow the oscillations of arm 130. Cam 163 is designed to lift plunger 161 and pin 149 in timed relation to the oscillation of arm 130. When pin 149 is elevated, arms 147 and 151 are lifted. In its elevated position, the ampoule engaging member 153 is removed from the path of the ampoules, but when the low side of cam 163 is under roller 162, spring 165 lowers arms 147 and 151. At this time cam follower 159 engages the lower portion of cam 156 which is inclined toward the axis of the conveyor, thus moving arms 147, 151 and pin 149 radially inward. This movement causes the contact piece 153 to engage an ampoule neck near the lower or bell end thereof. The brace roller is set at a height substantially in the same horizontal plane as that of the score lines on the ampoule and is further positioned to engage lightly the neck of the ampoule. When the contact piece 153 moves inwardly, it breaks off that portion of the ampoule neck below the score lines. The movement of the contact piece is compound, that is, it moves circumferentially with the conveyor at the same speed as that of the ampoules and at the same time moves radially inward to impose sufficient pressure on the lower end of an ampoule neck to fracture the neck along the line of the scores thereon. It is also reciprocated vertically. It is for this reason that plate 164 is sufficiently long and wide to permit the bearing end of the pin to travel in an irregular path on the plate while it is being elevated and lowered. It is to be understood that the breaking-off mechanism is so timed with respect to the conveyor that it successively engages the ampoules as they reach a point opposite the break-off device.

From the breaking-off mechanism, the ampoules are conveyed to the depressing rollers 64 where fingers 44 are lowered to disengage the bases of the ampoules from the pad 53. The trimmed ampoules are then supported more or less lightly on the conveyor and are readily removed by cam plate 68 after which they fall into chute 69.

In Figs. 13 and 14 there is shown a modification of the severing device. In this form of the invention the saws are replaced by burners 167, 168, disposed on opposite sides of the path of the ampoules. These burners project a cutting flame against the ampoule necks and not only sever the lower portion of the neck from the remainder of the ampoule, but seal the neck at the line of severance. In other respects the machine operates in the same manner as does that hereinbefore described, the parts of the modified machine corresponding to those previously described being indicated generally by the center shaft 23, spiders 37, 38, and flange 52. The position of the ampoule necks 71 with relation to the cutting flames is also illustrated.

While a preferred form of the invention has been illustrated in detail and the description refers to the particular embodiment shown, it is to be understood that the parts of the machine may be arranged in other ways provided only that the operations be substantially those set forth herein.

Having described my invention, what I claim as new and desire to secure by Letters Patent is:

1. In a machine for trimming glass containers, a conveyor for the containers, comprising a pair of spaced members, means for moving said conveyor, a plurality of spaced yieldable holding means on one of said members adapted to engage a portion of each container to urge the container against the other of said members, means engageable with both of said members for selectively varying the spaced relation of said members to accommodate containers of different sizes, a scorer positioned in the path of the containers for scoring the containers, means positioned in the path of said yieldable means and engageable therewith to release containers from the conveyor, and other means positioned in the path of the conveyed containers for ejecting containers from the conveyor.

2. In a machine for trimming glass ampoules of the character described wherein each ampoule has a body portion and a reduced neck portion, a conveyor for the ampoules comprising a pair of spaced plates, means for moving the conveyor, a plurality of spaced yieldable holding means on one of said plates adapted to engage the ampoules at the juncture of the body and neck thereof to urge the base of the ampoule against the other of said plates, a second pair of plates spaced from and movable with said first mentioned plates, said second pair of plates having spaced notches aligned with said holding means, said notches receiving the necks of the ampoules, a threaded member engageable with both of said second pair of plates for changing the relation of the notches to accommodate ampoules of varying diameters, and scoring means positioned in the path of the conveyed ampoules for scoring the necks of the ampoules.

3. In a machine for trimming glass ampoules of the character described, a conveyor for the ampoules, means for moving the conveyor, scoring means positioned in the path of the conveyed ampoules, a breaking-off mechanism spaced from said scoring means in the direction of travel of said conveyor comprising a movable member, means for moving said member into and in a direction transverse to the path of the conveyed ampoules to engage and fracture a scored ampoule, and other means for oscillating said member in a direction parallel to said path of travel.

4. In a machine for trimming glass ampoules of the character described wherein each ampoule has a body portion and a reduced neck, a conveyor for the ampoules, means for moving the conveyor, scoring means positioned in the path of the conveyed ampoules for scoring the necks thereof on a line transverse to the axis of the neck, a brace adjacent the scoring means and engageable with one side of the neck at the score line, a breaking-off member spaced from said scoring means in the direction of travel of said conveyor and engageable with the neck, said member and brace being positioned opposite each other and spaced longitudinally of the neck, means driven by the conveyor moving means for moving said member axially of and transversely to the neck to engage and fracture the neck, and other means for moving said member and said brace in the direction of and at the same speed as the travel of the conveyor.

5. In a machine for trimming glass ampoules of the character described, a conveyor for the ampoules, means for moving the conveyor, scoring means positioned in the path of the conveyed ampoules, a breaking-off mechanism spaced from said scoring means in the direction of travel of said conveyor comprising an oscillatable first arm, a second arm movable with said first arm and rockable in a direction at right angles to the direction of oscillation of said first arm, said second arm also being reciprocable longitudinally of said first arm, means for oscillating said first arm, means for rocking said second arm at right angles to the direction of oscillation of said first arm, means for reciprocating said second arm in a direction longitudinally of said first arm, the movement of said first arm in one direction being the same as that of the conveyed ampoules and at the same rate of travel as that of the ampoules, and ampoule engaging means on said second arm.

6. In a machine for trimming glass ampoules of the character described, a conveyor for the ampoules, means for moving the conveyor, scoring means positioned in the path of the conveyed ampoules, a breaking-off mechanism spaced from said scoring means in the direction of travel of said conveyor comprising an oscillatable first arm, a pivot member slidable longitudinally of said arm, a vertically rockable second arm movable with the first arm and pivoted on said pivot member, a cam member engageable with said second arm for reciprocating said second arm and pivot member longitudinally of the first arm, means for oscillating said first arm, means for rocking said second arm, and ampoule engaging means on said second arm.

7. In a machine for trimming glass ampoules of the character described wherein each ampoule has a body portion and a reduced neck portion, a conveyor for the ampoules comprising a pair of spaced plates, means for moving the conveyor, a plurality of spaced yieldable holding means on one of said plates adapted to engage the ampoules at the juncture of the body and neck thereof to urge the base of the ampoule against the other of said plates, a plurality of positioning means adapted to receive the necks of the ampoules to position the ampoules in predetermined relation to each other, said positioning means including two pairs of notched plates spaced from and movable with said first mentioned plates, the notches in one pair of plates being substantially parallel and radial, the notches in the other pair having oppositely directed inclined sides, the notches in all of said ampoule positioning plates being aligned with said yieldable means, said positioning plates being movable with respect to each other to vary the width and depth of the notches, and a threaded shaft connecting each pair of said plates for moving the plates of each pair with respect to each other.

LEON E. CLINE.